(12) United States Patent
Wu et al.

(10) Patent No.: US 11,909,466 B2
(45) Date of Patent: Feb. 20, 2024

(54) CHANNEL STATE INFORMATION FEEDBACK IN WIRELESS COMMUNICATION

(71) Applicant: ZTE Corporation, Guangdong (CN)

(72) Inventors: Hao Wu, Guangdong (CN); Yong Li, Guangdong (CN); Guozeng Zheng, Guangdong (CN); Zhaohua Lu, Guangdong (CN); Yu Ngok Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 327 days.

(21) Appl. No.: 17/403,497

(22) Filed: Aug. 16, 2021

(65) Prior Publication Data

US 2021/0376887 A1 Dec. 2, 2021

Related U.S. Application Data

(63) Continuation of application No. PCT/CN2019/075146, filed on Feb. 15, 2019.

(51) Int. Cl.
*H04B 7/0417* (2017.01)
*H04B 7/06* (2006.01)

(52) U.S. Cl.
CPC .......... *H04B 7/0417* (2013.01); *H04B 7/063* (2013.01); *H04B 7/0626* (2013.01); *H04B 7/0639* (2013.01)

(58) Field of Classification Search
CPC .... H04B 7/0417; H04B 7/0626; H04B 7/063; H04B 7/0639; H04B 7/0456; H04B 7/0632; H04B 7/0645; H04B 7/0478; H04B 7/0658

See application file for complete search history.

(56) References Cited

U.S. PATENT DOCUMENTS

| | | | |
|---|---|---|---|
| 8,798,195 B2 | 8/2014 | Tong et al. | |
| 10,009,088 B2 | 6/2018 | Rahman et al. | |
| 10,505,601 B2 | 12/2019 | Zhao et al. | |
| 10,581,497 B2 | 3/2020 | Liu et al. | |
| 11,616,549 B2 * | 3/2023 | Park | H04W 72/56 375/262 |

(Continued)

FOREIGN PATENT DOCUMENTS

| | | |
|---|---|---|
| CN | 106160926 A | 11/2016 |
| CN | 109302857 A | 2/2019 |

(Continued)

OTHER PUBLICATIONS

Chinese Notification to Complete Formalities of Registration issued in CN Patent Application No. 202210060445.3, dated Jul. 5, 2023, 4 pages. English translation included.

(Continued)

*Primary Examiner* — Hashim S Bhatti
(74) *Attorney, Agent, or Firm* — Perkins Coie LLP

(57) ABSTRACT

Methods, systems, and devices for reducing channel state information feedback channel overhead by compressing coefficients of precoding vectors and reporting a subset of the compressed coefficients based on several parameters including network-signaled parameters. Some embodiments may be used in wireless communication embodiments in which channel state information from many layers and many frequency domain units need to be reported.

24 Claims, 5 Drawing Sheets

(56) References Cited

U.S. PATENT DOCUMENTS

| | | |
|---|---|---|
| 2016/0119097 A1 | 4/2016 | Nam et al. |
| 2018/0138950 A1 | 5/2018 | Rahman et al. |
| 2018/0167116 A1 | 6/2018 | Rahman et al. |
| 2018/0212656 A1 | 7/2018 | Zhao et al. |
| 2018/0278315 A1 | 9/2018 | Wu et al. |
| 2022/0029674 A1* | 1/2022 | Landmann ............ H04W 76/00 |
| 2022/0039107 A1* | 2/2022 | Wei ...................... H04B 7/0417 |
| 2022/0149908 A1* | 5/2022 | Gao ...................... H04B 7/0634 |

FOREIGN PATENT DOCUMENTS

| | | |
|---|---|---|
| RU | 2557462 C2 | 7/2015 |
| WO | 2016115654 A1 | 7/2016 |
| WO | 2017/135987 A1 | 8/2017 |
| WO | 2018127067 A1 | 7/2018 |
| WO | 2019/004886 A1 | 1/2019 |

OTHER PUBLICATIONS

Japanese Notice of Allowance issued in JP Patent Application No. 2021-547753, dated Aug. 2, 2023, 6 pages. English translation included.
Korean office action issued in KR Patent Application No. 2021-7029407, dated Jul. 3, 2023, 6 pages. English translation included.
European Search Report for EP Patent Application No. 19915341.2, dated Feb. 17, 2022, 11 pages.
Ericsson, "On CSI enhancements for Mu-Mimo," 3GPP TSG RAN WG1 Meeting Ad-Hoc Meeting 1901, R1-1900757, Taipei, Taiwan, Jan. 21-25, 2019, 12 pages.
Samsung, "Summary of CSI enhancement for Mu-Mimo," 3GPP TSG RAN WG1 Ad-Hoc Meeting 1901, R1-1901075, Taipei, Taiwan, Jan. 21-25, 2019, 16 pages.
International Search Report and Written Opinion dated Nov. 6, 2019 for International Application No. PCT/ CN2019/075146, filed on Feb. 15, 2019 (7 pages).
Indian Examination Report issued in IN Patent Application No. 202147041696, dated Jan. 4, 2023, 6 pages.
Korean Office Action issued in KR Patent Application No. 10-2021-7029407, dated Feb. 9, 2023, 8 pages. English translation included.
VIVO, "Discussion on type II CSI compression and feedback parameters," 3GPP TSG RAN WG1 Ad-Hoc Meeting 1901, R1-1900136, Taipei, Jan. 21-25, 2019, 6 pages.
Canadian Office Action issued in CA Patent Application No. 3,130,222, dated Jan. 19, 2023, 5 pages.
Chinese Office Action issued in CN Patent Application No. 202210060445.3, dated Mar. 2, 2023, 8 pages. English translation included.
Chinese Office Action issued in CN Patent Application No. 202210060445.3, dated Sep. 16, 2022, 11 pages. English translation included.
Japanese Office Action issued in JP Patent Application No. 2021-547753, dated Oct. 4, 2022, 7 pages. English translation included.
Nokia et al., "Remaining details for Type I and Type II CSI reporting," 3GPP TSG RAN WG1 Meeting AH 1801, R1-1800754, Vancouver, Canada, Jan. 22-26, 2018, 5 pages.
Russian Decision on Grant issued in RU Patent Application No. 2021126932, dated Jul. 18, 2022, 15 pages. English translation included.
Russian Office Action issued in RU Patent Application No. 2021126932, dated Mar. 24, 2022, 12 pages. English translation included.
Japanese office action issued in JP Patent Application No. 2021-547753, dated Apr. 17, 2023, 7 pages. English translation included.
Korean notice of allowance issued in KR Patent Application No. 10-2021-7029407, dated Oct. 13, 2023, 8 pages. English translation included.
Canadian notice of allowance issued in CA Patent Application No. 3,130,222, dated Nov. 14, 2023, 3 pages.

* cited by examiner

CHANNEL STATE INFORMATION FEEDBACK IN WIRELESS COMMUNICATION

CROSS-REFERENCE TO RELATED APPLICATIONS

This application is a continuation of International Patent Application No. PCT/CN2019/075146, filed on Feb. 15, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. A key enabler to meeting the requirements of enhanced mobile broadband in the upcoming 5th Generation (5G) New Radio (NR) networks is massive multi-input multi-output (MIMO) and beamforming techniques where multiple transmit antennas and/or multiple receive antennas are utilized in wireless nodes. Using this, base-stations and user devices, can increase the performance, efficiency, and reliability of the wireless communication link between them. Accurate estimation and reporting channel state information (CSI) is important in such systems. However, the overhead of reporting CSI increases as the number of utilized frequency band and transmit/receive antennas increases which is particularly problematic given the large bandwidths and numerous spatial streams from many transmit/receive antennas in 5G NR radio networks.

SUMMARY

This document relates to methods, systems, and devices for reducing the overhead in reporting channel state information (CSI) such as precoding matrix indicators by compressing the coefficients of precoding vectors. In some embodiments, reporting is performed using only a subset of the compressed coefficients based on various criterion.

In one representative aspect, a wireless communication method of a wireless communication device is disclosed. The method includes determining spatial basis vectors, and spatial basis vector coefficients where a precoding vector of the spatial channel is defined by a linear combination of the spatial basis vectors and the spatial basis vector coefficients. The precoding vector is a vector that can be used to pre-code a transmit data stream to mitigate impairments of the wireless channel. The method further includes compressing the spatial basis vector coefficients by determining frequency domain (FD) unit basis vectors and FD basis vector coefficients such that a combination of the FD basis vectors and the FD basis vector coefficients define the spatial basis vector coefficients but at a reduced overhead. The wireless communication device can then generate CSI (and a corresponding CSI feedback report) based on the spatial basis vectors, the FD basis vectors, and the FD basis vector coefficients, among other parameters.

In another example aspect, a wireless communication apparatus comprising a processor is disclosed. The processor is configured to implement the above-described method.

In another example aspect, a computer program product is disclosed. The computer program product includes a computer-readable medium that stores processor-executable instructions embodying the above-described method.

The above and other aspects and their implementations are described in greater detail in the drawings, the descriptions, and the claims.

DETAILED DESCRIPTION

Figure 1:
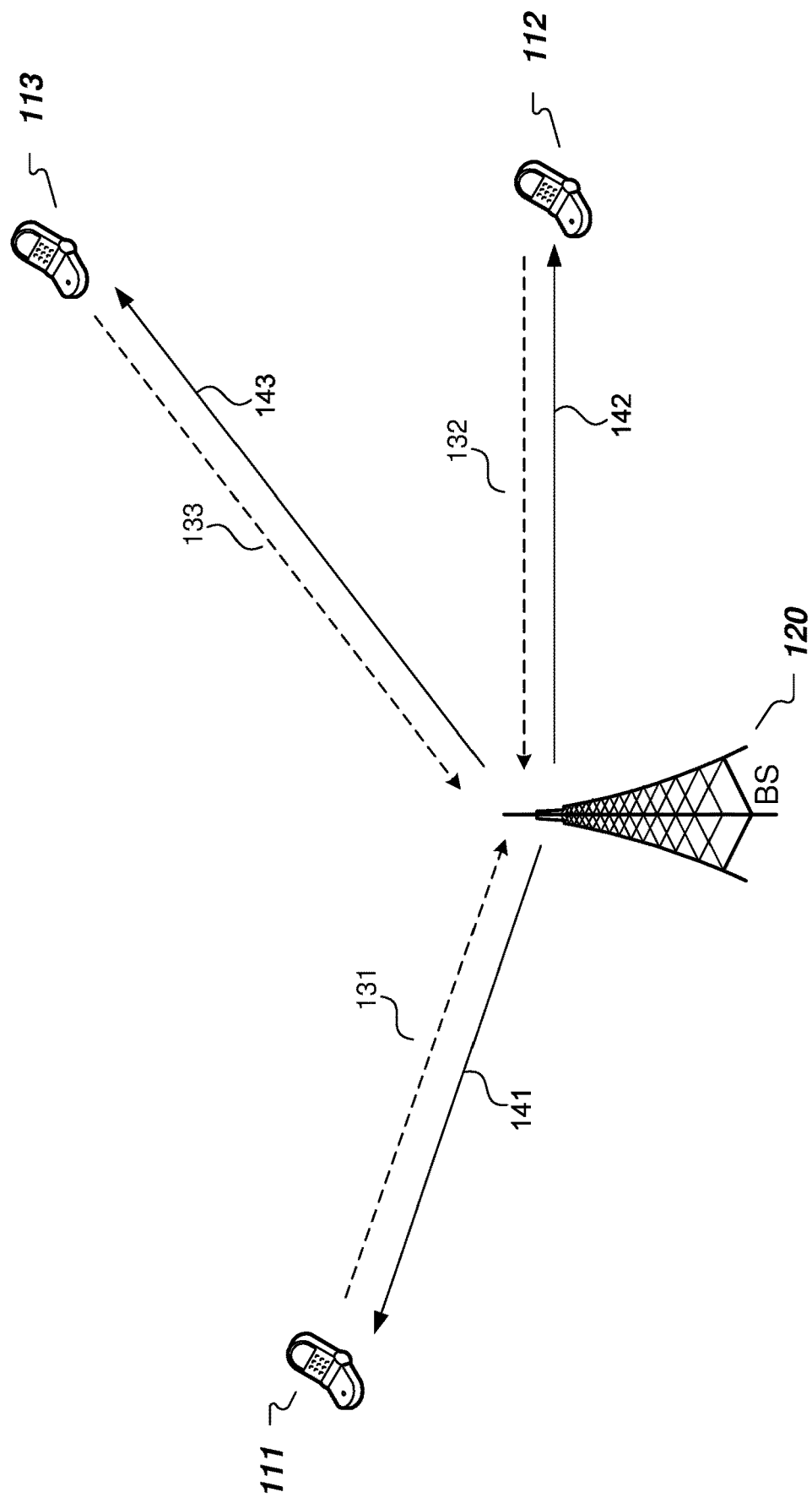
FIG. 1 shows an example of a base station (BS) and user equipment (UE) in wireless communication.

There is an increasing demand for fourth generation of mobile communication technology (4G, the 4th Generation mobile communication technology), Long-term evolution (LTE, Long-Term Evolution), and fifth-generation mobile communication technology (5G, the 5th Generation mobile communication technology) also called NR (New Radio).

In MIMO wireless communication systems, multiple antennas are used to perform signal transmissions. Such implementations include transmitter side processing, such as precoding or beamforming, to increase transmission performance including efficiency and reliability. To achieve high-performance precoding or beamforming, the precoding matrix or beamforming vector is selected to match the wireless channel. The transmitter therefore needs to determine the channel state information (CSI) to accurately pre-code or beamform the transmitted signal. A receiver device can determine CSI based on received reference signals (e.g., CSI reference signals (CSI-RS), sounding reference signals (SRS), etc.) or pilots and then can report back the CSI to the transmitter (e.g., a UE can report the CSI to a BS). Accurate CSI feedback enables high-performance MIMO transmission.

However, the feedback of high-resolution CSI is costly in terms of overhead required in the feedback channel. This is especially the case when the transmitter needs CSI across multiple sub-bands (frequency segments) or transmission layers (spatial streams). The performance-to-overhead trade-off of CSI feedback is a key metric to realizing the performance of high-resolution CSI.

In MIMO systems, the user device (e.g., user equipment (UE)) typically reports to a wireless node (e.g., a base station) the CSI which includes a precoding matrix indicator (PMI), a rank indicator (RI), and a channel quality indicator (CQI), among other parameters. RI indicates the number of layers (which is related to the rank of the channel matrix), whereas PMI indicates a precoding vector. The precoding vector is used by the wireless node to pre-code each layer and is represented as a linear combination of a set of spatial basis vectors. The UE quantizes (e.g., converts to a digital representation) the amplitudes and phases of the coefficients in the linear combination and the selected spatial basis vectors and reports the quantized values to the base station.

To allow for frequency-selective scheduling, for example, the quantized phases and amplitudes are reported for each sub-band (or a subset of a sub-band representing a frequency domain unit) if multiple sub-bands are contained in the CSI reporting band. This high-resolution CSI feedback results in high performance MIMO transmission. However, for determining or reporting CSI in multiple frequency domain units (or sub-bands) or across multiple layers, the overhead can be quite large consuming a large amount of resources in the feedback channel. Additionally, such high-resolution CSI increases the UE's complexity and results in larger power consumption. It is therefore beneficial to have a CSI reporting technique that provides for high-resolution CSI for multiple sub-bands and/or layers, provides for high performance MIMO or beamforming, but with a reduced CSI reporting overhead.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

FIG. 1 shows an example of a wireless communication system (e.g., an LTE, 5G or New Radio (NR) cellular network) that includes a BS 120 and one or more user equipment (UE) 111, 112 and 113. The uplink transmissions (131, 132, 133) can include CSI feedback reports as disclosed in this document. The UE may be, for example, a smartphone, a tablet, a mobile computer, a machine to machine (M2M) device, a terminal, a mobile device, an Internet of Things (IoT) device, and so on.

Figure 2:
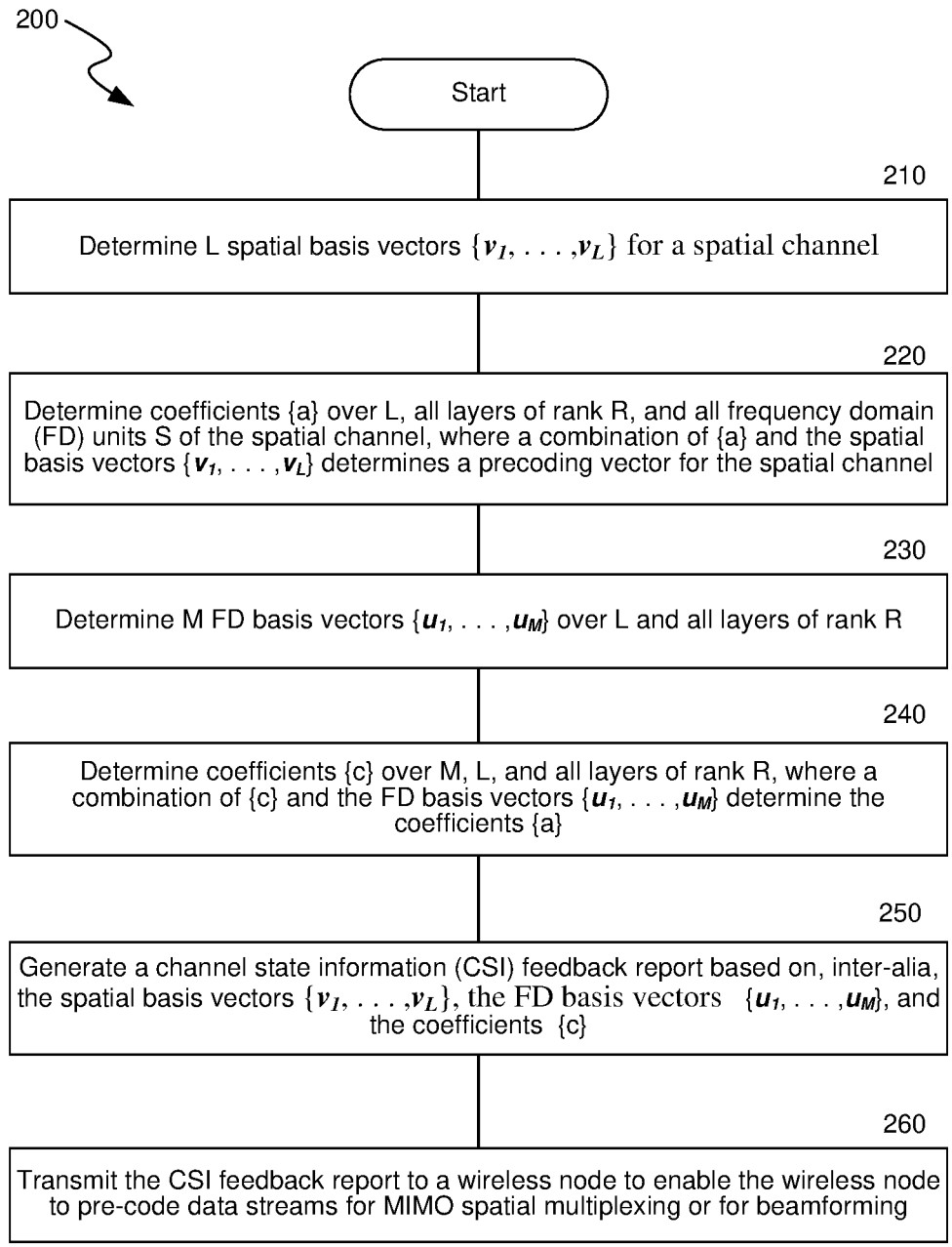
FIG. 2 shows a representative flow illustrating a method for compressing coefficients of precoding vectors for determining CSI.

FIG. 2 shows an example block diagram illustrating a method for compressing coefficients of precoding vectors. At block 210, the wireless device (e.g., a UE) determines L spatial basis vectors $[v_1, v_2, \ldots, v_l, \ldots, v_L]$ for a spatial channel. In some embodiments, the L spatial basis vectors can be formed based on discrete Fourier transform (DFT) vectors or Kronecker product of DFT vectors.

At block 220, the wireless device determines complex coefficients $\{a_{l,s}^r\}$ (i.e., coefficients having a magnitude and phase), where $l=1, 2, \ldots, L$ are the number of spatial basis vectors, $s=1, 2, \ldots, S$ are the number of frequency domain (FD) units or sub-bands (i.e., frequency segments over which CSI is to be reported), and $r=1, 2, \ldots, R$ are the layer indices for the rank-R spatial channel (i.e., the layers of rank-R). The complex coefficients $\{a_{l,s}^r\}$ (written simply as $\{a\}$) are selected such that a combination (e.g., a linear combination) of the complex coefficients $\{a\}$ with the spatial basis vectors determines a precoding vector for the spatial channel over all layers $r \in \{1, 2, \ldots, R\}$ and all FD units $s \in \{1, 2, \ldots, S\}$. The UE can determine the spatial basis vectors and the spatial basis vector coefficients from received reference signals or pilots transmitted by a wireless node (e.g., a base station), for example, from CSI-RS (CSI Reference Signals) with known amplitudes and phase offsets.

At block 230 and 240, the wireless device compresses the complex coefficients $\{a\}$ to reduce the overhead in reporting CSI to the base station. At block 230 the UE determines M FD basis vectors $\{u_{l,1}^r, \ldots, u_{l,m}^r, \ldots, u_{l,M}^r\}$ over L, and over all the layers r of rank R, and at block 240 the UE determines complex coefficients $\{c_{l,m}^r\}$ (written simply as $\{c\}$) over L, M and over all the layers r of rank R. The UE selects the FD basis vectors and complex coefficients $\{c\}$ such that a combination of the FD basis vectors and the complex coefficients $\{c\}$ (e.g., a linear combination) determines the complex coefficients $\{a\}$ of block 220. Furthermore, as described further below, the network and the UE ensure that the number of bits needed to report the FD basis vectors and the complex coefficients $\{c\}$ is lower than the number of bits needed to report $\{c\}$ thus reducing the overhead in CSI feedback reporting after the compression (for example, by the selection of M). Various techniques to further reduce this overhead are described below in relation to embodiments of the disclosed technology.

At block 250, the wireless device generates a CSI feedback report based on, the spatial basis vectors, the FD basis vectors, the complex coefficients $\{c\}$, and other additional parameters described below. That is, rather than reporting the complex coefficients $\{a\}$, the UE can report, at a reduced overhead, the complex coefficients $\{c\}$ along with the FD basis vectors.

At block 260, the wireless device transmits the CSI feedback reports to a wireless node (e.g., to a base station in a physical uplink shared channel (PUSCH) or in a physical uplink control channel (PUCCH)). The base station can incorporate this feedback information into decisions on pre-coding or beamforming downlink data streams and generating transmission waveforms. In some embodiments, the wireless device can be a base station and can exclude the generation and transmission of a CSI feedback report.

Figure 3:
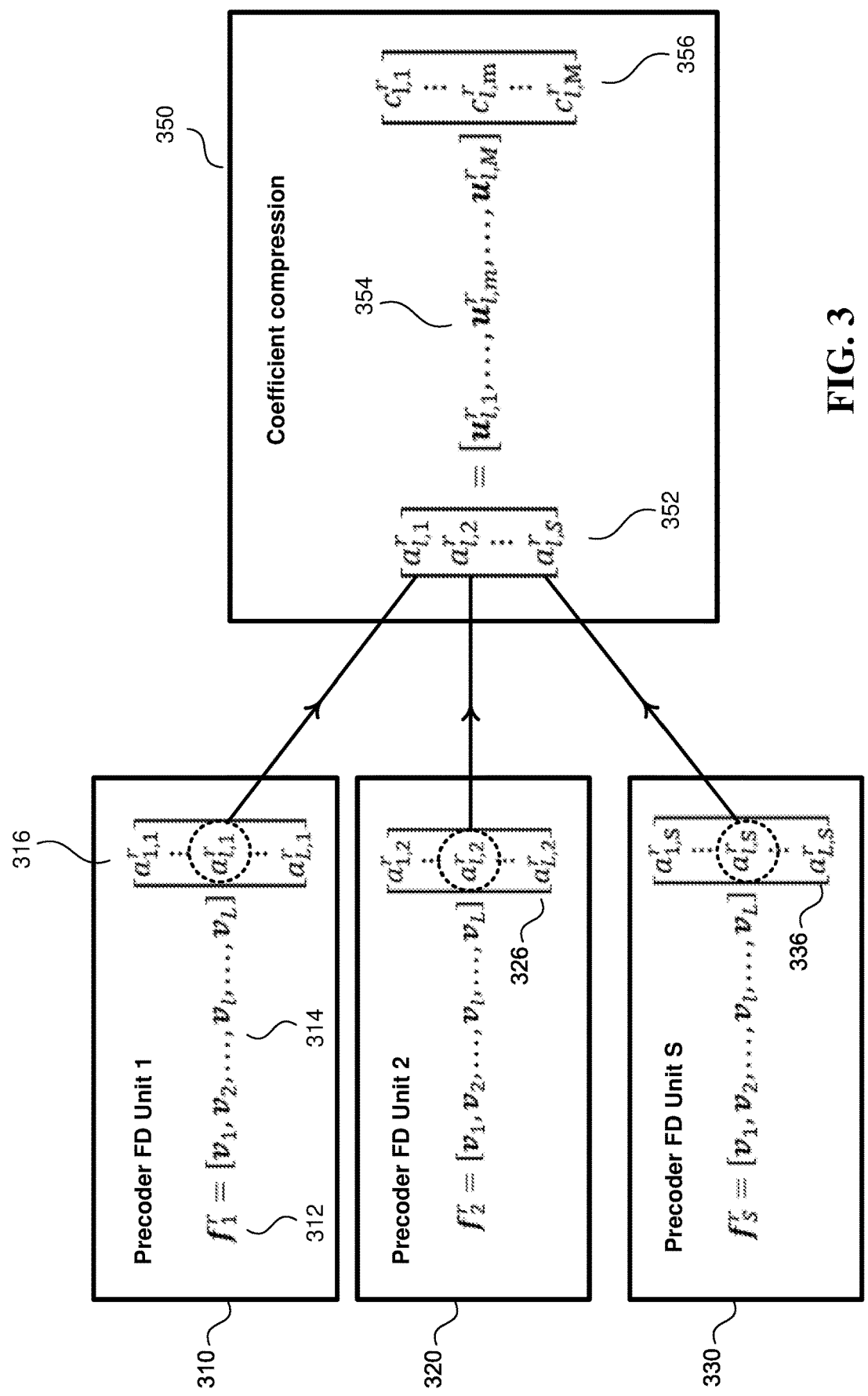
FIG. 3 shows an example block diagram illustrating a method for compressing coefficients of precoding vectors.

FIG. 3 shows a block diagram illustrating a method for compressing coefficients of precoding vectors (e.g., MIMO precoding vectors, or beamforming weights). Such precoding vectors can be used in, for example, CSI feedback reports sent by UEs to base stations to support high performance MIMO/beamforming transmissions.

1.0 Representative Embodiments for Compressing Precoding Vector Coefficients and Reporting a Subset of Coefficients for Each Layer In some embodiments, user devices (e.g., UEs) report back to a wireless node (e.g., base stations) channel state information (CSI) in the form of a precoding matrix indicator (PMI). The PMI can be represented as a linear combination of spatial basis vectors over each layer r and frequency domain (FD) units. For example, for L spatial basis vectors $[v_1, v_2, \ldots, v_L]$, the precoding vector can be represented as:

$$f_s^r = [v_1, v_2, \ldots, v_l, \ldots, v_L] \begin{Bmatrix} a_{1,s}^r \\ \vdots \\ a_{l,s}^r \\ \vdots \\ a_{L,s}^r \end{Bmatrix} \quad \text{(EQN. 1)}$$

where r is the layer index, s is the FD unit index, $\{v_1, v_2, \ldots, v_L\}$ are the L spatial basis vectors, and $\{a_{l,s}^r\}$ are the coefficients of the precoding vector used to form the linear combination with the spatial basis vectors. In some embodiments, the L spatial basis vectors can be formed based on discrete Fourier transform (DFT) vectors or Kronecker product of DFT vectors. The coefficients $\{a_{l,s}^r\}$ are complex variables including a magnitude and a phase and are quantized by the user device and reported to the base station as part of the reported CSI feedback. Because the coefficients $\{a_{l,s}^r\}$ can be different for different frequency domain units and/or layers, the overhead in reporting the quantized amplitudes and phases of $\{a_{l,s}^r\}$ can be quite large particular for large number of FD units (e.g., for wide bandwidth divided into multiple small subbands or FD units where CSI is reported over all such FD units), and for a large number of layers (e.g., for massive MIMO systems with large number of transmit and receive antennas over a full rank channel).

Therefore, in some representative embodiments, to reduce the overhead in reporting the quantized amplitudes and phases of $\{a_{l,s}^r\}$, the UE compresses the coefficients $\{a_{l,s}^r\}$ using a coefficient compression module 350 as shown in FIG. 3. That is, for each layer r, the coefficient of spatial basic vector 1 ($v_l$) across all the S FD units (block 352 in FIG. 3) can be expressed as:

$$a_l^r = \begin{bmatrix} a_{l,1}^r \\ a_{l,2}^r \\ \vdots \\ a_{l,S}^r \end{bmatrix} = [u_{l,1}^r, \ldots, u_{l,m}^r, \ldots, u_{l,M}^r] \begin{bmatrix} c_{l,1}^r \\ \vdots \\ c_{l,m}^r \\ \vdots \\ c_{l,M}^r \end{bmatrix} \quad \text{(EQN. 2)}$$

where $\{u_{l,1}^r, \ldots, u_{l,M}^r\}$ (block 354 in FIG. 3) are the M length-N3 FD basis vectors, and $c_{l,m}^r$ in block 356 is the coefficient for beam 1 and FD basis vector m after compression by the coefficient compression module 350. The coefficient compression module 350 can generate the FD basis vector $\{u_{l,1}^r, \ldots, u_{l,M}^r\}$ based on DFT vectors.

Before compression, the precoder FD unit 1 (block 310) generates a precoding vector $f_1^r$; (output 312) for the first FD unit and a layer r, as a linear combination of the spatial basic vectors [$v_1, v_2, \ldots, v_l, \ldots, v_L$] (block 314) and the coefficients $\{a_{l,1}^r\}$ (block 316). This can be expressed as:

$$f_1^r = [v_1, v_2, \ldots, v_l, \ldots, v_L] \begin{bmatrix} a_{1,1}^r \\ \vdots \\ a_{l,1}^r \\ \vdots \\ a_{L,1}^r \end{bmatrix} \quad \text{(EQN. 3)}$$

Similarly, the precoder FD unit 2 (block 320) generates a precoding vector $f_2^r$ for the second FD unit and a layer r, as a linear combination of the spatial basic vectors [$v_1, v_2, \ldots, v_l, \ldots, v_L$] and the coefficients $\{a_{l,2}^r\}$ (block 326) which can be expressed as:

$$f_2^r = [v_1, v_2, \ldots, v_l, \ldots, v_L] \begin{bmatrix} a_{1,2}^r \\ \vdots \\ a_{l,2}^r \\ \vdots \\ a_{L,2}^r \end{bmatrix} \quad \text{(EQN. 4)}$$

The S-th precoder FD unit (block 330) generates a precoding vector as expressed by:

$$f_S^r = [v_1, v_2, \ldots, v_l, \ldots, v_L] \begin{bmatrix} a_{1,S}^r \\ \vdots \\ a_{l,S}^r \\ \vdots \\ a_{L,S}^r \end{bmatrix} \quad \text{(EQN. 5)}$$

In some embodiments, the UE reports the FD basic vector $\{u_{l,1}^r, \ldots, u_{l,m}^r, \ldots, u_{l,m}^r\}$ (block 354), and the coefficients of the FB basis vector $\{c_{l,m}^r\}$ (block 356), generated by the coefficient compression module 350 instead of reporting the coefficients $\{a_{l,s}^r\}$. Because of the correlation of the coefficients $\{a_{l,s}^r\}$ before compression, M can be set to be smaller than 2 L resulting in a lower overhead in transmitting the FD basis vectors $\{u_{l,1}^r, \ldots, u_{l,M}^r\}$ and the coefficients $\{c_{l,m}^r\}$ relative to the overhead in transmitting the uncompressed coefficients $\{a_{l,s}^r\}$. A benefit from the compression can be achieved for M<S.

In some embodiments, the overhead in reporting the L*M coefficients $\{c_{l,m}^r\}$ can be further reduced, for example, by selecting, for each layer, K0 subset of the L*M coefficients. That is, the number of non-zero coefficients is constrained to be no larger than K0 (i.e., an upper bound for the number of coefficients in the subset is K0), and the UE reports the location or position of the K1 non-zero coefficients in the L*M coefficients, and the amplitudes and phases of the K1 coefficients.

In some embodiments, the value of M can be based on N3 values and/or network-configured parameters (e.g., N3=S). For example, M=ceil(pN$_3$), where p is based on network configured parameters, and M is the least integer greater than or equal to the product of p and the N3 value (ceiling function) (ceil(x)=least integer greater than or equal to x). In other embodiments, M can be constrained by other parameters configured in the UE or derived by the UE.

In some embodiments, the UE or the network can set the value of K0 to depend on L, M, and/or parameters configured by the network. For example, K0 can be set to K0=ceil (βLM), where β can be based on configured parameters.

2.0 Representative Embodiments for Constraining the Overhead for Reporting CSI

In some embodiments, CSI can be divided into two parts, for example a CSI part 1 and a CSI part 2. In CSI part 1, the UE can report a channel quality indicator (CQI), a rank indicator (RI), and a value indicating the number of non-zero coefficients ($\{c_{l,m}^r\}$) across a number of layers (e.g., across R layers, wherein R is the rank value), among other parameters. The bit width of the indication of the number of non-zero coefficients across a number of layers can be determined by a maximum number of layers. The maximum number of layers can be determined by the maximum rank that a codebook can support (for codebook-based precoding), a network configuration parameter, a capability value that the UE reports to the base station, etc. In CSI part 2, the UE reports other CSI parameters such as a precoding matrix indicator (PMI). The reported PMI can include an indicator for the spatial basis vectors (e.g., vectors 314 in FIG. 3), an indicator for the FD basis vectors (e.g., vectors 354), an indicator for the amplitude and phase of the compressed coefficients (e.g., coefficients 356), and an indication of the location of the non-zero coefficients in the L*M coefficients.

In some embodiments, CSI parameters in each part are jointly channel coded, but different parts are channel-coded independently. Additionally, the payload of CSI part 2 can depend on the value of CSI part 1 so that the network need not always reserve the maximum overhead for CSI transmission. That is, CSI part 1 can have a fixed allocation and can contain parameters that always need to be fed back, and CSI part 2 can include parameters that may not always need to be fed back or that can have variable size (e.g., variable bit width). Using this approach, when CSI part 2 does not utilize the maximum possible overhead, the unused overhead is saved from allocation leading to higher efficiency. For example, if the maximum number of layers that the UE reports in a capability value is R1 (i.e., UE capable of processing up to only R1 layers), and the number of coefficients to report per layer is constrained to K0, the minimum bits required to report K0*R1 non-zero coefficients is ceil($\log_2$ (R1×K0)). Alternatively, if the maximum number of layers is limited by a network configuration parameter to R2 (e.g., based on a parameter limiting the RI values that the UE can report), the minimum bits to report K0*R2 non-zero coefficients is ceil($\log_2$ (R2×K0)). Alternatively, if the number of RI values that the codebook in use can support is R3, the minimum bits to report R3*K0 non-zero coefficient ceil($\log_2$ (R3×K0)). In some embodiments, when the UE has multiple constraints on the number or layers (e.g., number of layers constrained by two or more of R1, R2, or R3) the bit-width to report the non-zero coefficients can be set to ceil($\log_2$ (R4×K0)), where R4 is the minimum of {R1, R2, R3}.

3.0 Representative Embodiments for Constraining the Overhead for Reporting CSI for Large Ranks As the number of compressed coefficients $\{c_{l,m}^r\}$ (e.g., block 356 in FIG. 3) increases with increasing number of layers R, (e.g., as the rank of the spatial channel increases), the CSI overhead likewise increases. Therefore, in some embodiments, the number of spatial basis vectors (e.g., vectors 314), the number of FD basis vectors (e.g., vectors 354), or the number of coefficients in the K0 subset of the L*M coefficients can be constrained to not grow too much with increased R (or to grow at a lower rate), e.g., to be the same when R is large as when R is small.

For a rank-R CSI report, if the rank, R, is selected from a candidate set S1 of rank values, the bit width to report the non-zero coefficients depends on the maximum number of coefficients in the K0-subset that can be reported across all the layers for any of the rank values in the candidate set S1. For example, if a rank $R_{max}$ in S1 would yield the maximum number of coefficients in the K0-subset across all the layers, the bit width for reporting the non-zero coefficients can be as large as ceil($\log_2$ ($R_{max}$×K0)). That is, the bit width for reporting the non-zero coefficients is ceil($\log_2$ (max({S1})× K0)), where max({S1}) is the rank ($R_{max}$) in S1 yielding the maximum number of coefficients in the K0-subset. In some embodiments, the candidate set S1 can be determined by a network configuration parameter and/or a capability value that UE reports.

In some embodiments, the total number of spatial basis vectors of all the R layers for a rank-R CSI report, can be constrained to be less than or equal to the total number of spatial basis vectors of all the R0 layers for a rank-R0 CSI report, where R>R0≥1. Additionally, in some embodiments, the bit width used to report the number of non-zero coefficients in CSI part 1 can be based on the number of spatial basis vectors in each layer when the rank is R0. For example, the bit width can be constrained to ceil($\log_2$ (R0×ceil(β× M*2L*R0))), where L*R0 is the number of spatial basis vectors in each layer when the rank is R0.

In some embodiments, the total number of FD basis vectors of all the R layers for a rank-R CSI report, can be constrained to be less than or equal to the total number of FD basis vectors of all the R0 layers for a rank-R0 CSI report, where R>R0≥1. Additionally, in some embodiments, the bit width used to report the number of non-zero coefficients in CSI part 1 can be based on the number of FD basis vectors in each layer when the rank is R0. For example, the bit width can be constrained to ceil($\log_2$ (R0×ceil(β×M*2L*R0))), where M*R0 is the number of FD basis vectors in each layer when the rank is R0.

In some embodiments, the total number of coefficients in the K0-subset of all the R layers can be constrained to be less than or equal to the total number of coefficients in the K0-subset of all the R0 layers for a rank-R0 CSI report, where R>R0≥1. Additionally, in some embodiments, the bit width used to report the number of non-zero coefficients in CSI part 1 can be based on the K0 value when the rank is R0. For example, the bit width can be constrained to ceil($\log_2$ (R0×K0*R0)), where K0*R0 is K0 value in each layer when the rank is R0.

3.1 Representative Embodiments for Constraining the Number of FD Basis Vectors Per Layer, or the K0 Value Per Layer, for Larger Ranks to be a Predetermined Fraction of the Values for Lower Ranks:

In some embodiments, the number of FD basis vectors for each layer for a rank-R CSI report can depend on the value of the rank, R. For example, if for ranks less than or equal to 2, the number of FD basis vectors for each layer is M0, the number of FD basis vectors per layer for any rank R>2 can be set to $$M = \text{floor}\left(\frac{2}{R}M0\right).$$

That is, M can be set to the greatest integer less than or equal to $$\frac{2}{R} * M0 (\text{floor}(x) = \text{greatest integer less than or equal to } x).$$

In some embodiments, a range of ranks can be constrained such that the total number of FD basis vectors remains constant for ranks within the range. For example, if the number of FD basis vectors per layer for rank-2 is M0, the number of FD basis vectors per layer for rank-3 and rank-4 can be constrained to $$M = \text{floor}\left(\frac{1}{2}M0\right).$$

Thus, a rank-4 CSI report would have the same total number of FD basis vectors as a rank-2 CSI report.

In some embodiments, the K0 value can be based on the rank value. For example, if the K0 value for ranks less than or equal to 2 is $K0_1$, the K0 value for rank-R (R>2) can be set to $$K0 = \text{floor}\left(\frac{2}{R}K0_1\right).$$

In some embodiments, a range of ranks can be constrained to have the same fraction of K0 values per layer as a specified lower rank K0 value. For example, if ranks less than or equal to 2 have a K0 value of $K0_1$, rank-3 and rank-4 can be constrained to have a K0 value of $$\text{floor}\left(\frac{1}{2}K0_1\right).$$

3.2 Representative Embodiments for Constraining the Number of Spatial Basis Vectors Per Layer, the Number of FD Basis Vectors Per Layer, and the K0 Value Per Layer Based on a Maximum Rank Riven by Network Configuration Parameters:

In some embodiments, for a rank-R CSI report, the number of FD basis vectors for each layer can be based on a maximum rank value given by a network configuration parameter. For example, if the number of FD basis vectors for each layer for ranks less than or equal to 2 is M0, the number of FD basis vectors per layer for ranks greater than 2 can be set to $$M = \text{floor}\left(\frac{2}{R\_cfg}M0\right),$$

where R_cfg is the maximum rank value given by the network configuration parameter.

In some embodiments, for a rank-R CSI report, the K0 value of each layer can be based on a maximum rank value given by a network configuration parameter. For example, if the K0 value for each layer for ranks less than or equal to 2 is $K0_1$, the K0 value for each layer for ranks greater than 2 can be set to $$K0 = \text{floor}\left(\frac{2}{R\_cfg}K0_1\right),$$

where R_cfg is the maximum rank value given by the network configuration parameter.

In some embodiments, for a rank-R CSI report, the number of spatial basis vectors for each layer can be based on a maximum rank value given by a network configuration parameter. For example, if the number of spatial basis vectors for each layer for ranks less than or equal to 2 is L0, the number of spatial basis vectors per layer for ranks greater than 2 can be set to $$L = \text{floor}\left(\frac{2}{R\_cfg}L0\right),$$

where R_cfg is the maximum rank value given by the network configuration parameter.

3.3 Representative Embodiments for Constraining the Number of Spatial Basis Vectors Per Layer, the Number of FD Basis Vectors Per Layer, and the K0 Value Per Layer Based on A UE Capability:

In some embodiments, for a rank-R CSI report, the number of FD basis vectors for each layer depends on a maximum rank value that the UE can support or that the UE reports in a capability parameter (i.e., UE capability value). For example, if the number of FD basis vectors for each layer for ranks less than or equal to 2 is M0, the number of FD basis vectors per layer for ranks greater than 2 can be set to $$M = \text{floor}\left(\frac{2}{R\_UE}M0\right),$$

where R_UE is the maximum rank value given by the UE capability value.

In some embodiments, for a rank-R CSI report, the K0 value of each layer can be based on a reported UE capability value. For example, if the K0 value for each layer for ranks less than or equal to 2 is $K0_1$, the K0 value for each layer for ranks greater than 2 can be set to $$K0 = \text{floor}\left(\frac{2}{R\_UE}K0_1\right),$$

where R_UE is the maximum rank value given by the UE capability value.

In some embodiments, for a rank-R CSI report, the number of spatial basis vectors for each layer can be based on a reported UE capability value. For example, if the number of spatial basis vectors for each layer for ranks less than or equal to 2 is L0, the number of spatial basis vectors per layer for ranks greater than 2 can be set to $$L = \text{floor}\left(\frac{2}{R\_UE}L0\right),$$

where R_UE is the maximum rank value given by the UE capability value.

Figure 4:
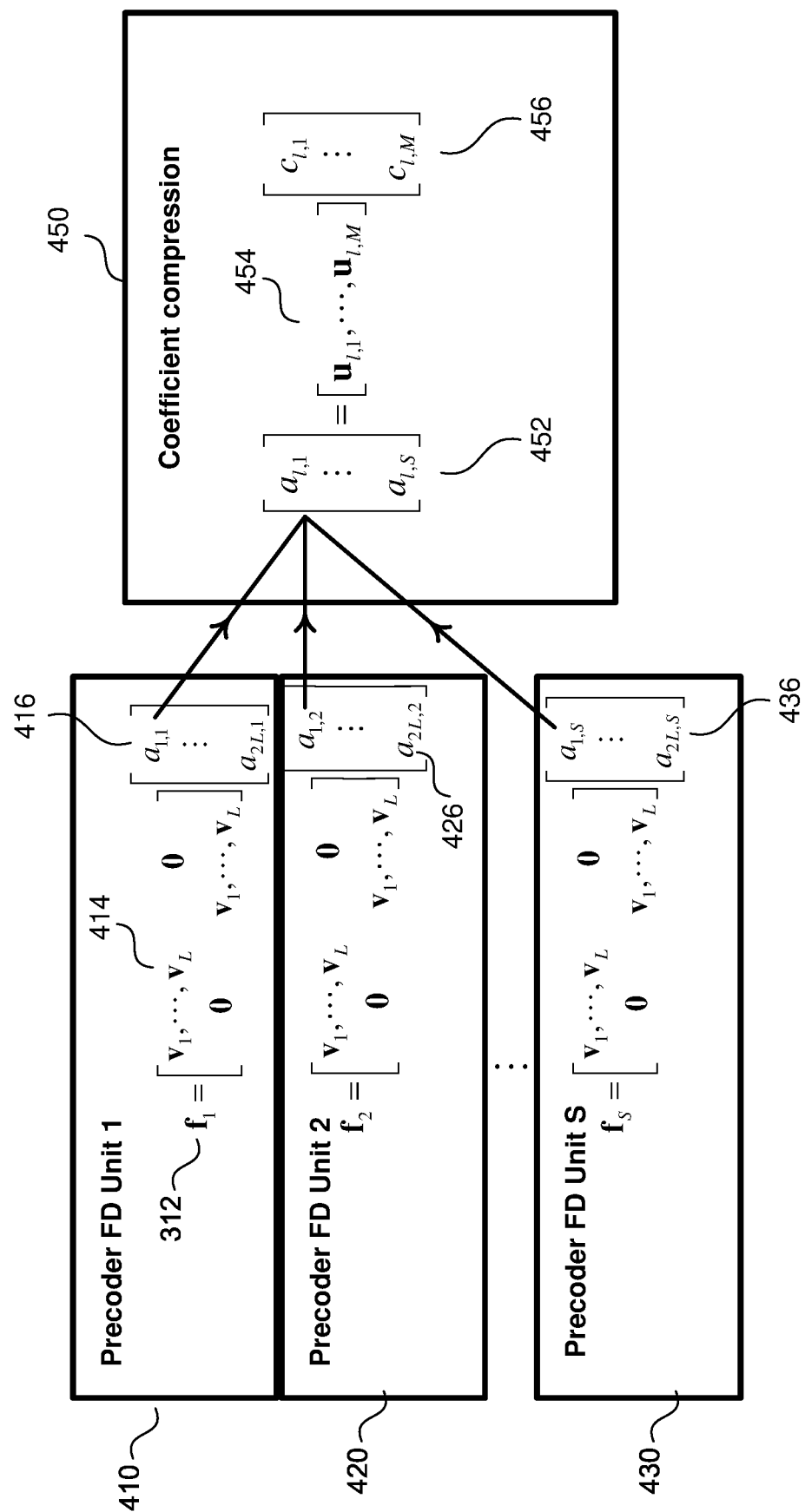
FIG. 4 shows an example block diagram illustrating a method for compressing coefficients of precoding vectors based on some constraints.

FIG. 4 shows a block diagram illustrating a method for compressing coefficients of precoding vectors where M is set equal to 2 L. That is each of the 2 L coefficients (e.g., coefficients 416, 426, and 436) for each FD units (a total of S*2 L coefficients over all S FD units) are compressed to M*2 L coefficients (for each rank) by a coefficient compression module 450. This compression can be realized by decomposing the spatial basis vector coefficients (e.g., coefficients 452) into a linear combination of the FD basis vector coefficients (e.g., coefficients 456) and the FD basis vectors (e.g., vectors 454).

Some example embodiments may be described using the following clauses.

Clause 1. A wireless device (e.g., UE) generates a channel state information (CSI) based at least in part on a first plurality of L basis vectors (e.g., spatial basis vectors), a second plurality of M basis vectors (e.g., FD basis vectors) and a plurality of coefficients (e.g., coefficients for FD basis vectors), wherein the first plurality of basis vectors, the second plurality of basis vectors and the plurality of coefficients are indicate information regarding a precoding vector (i.e., the basis vectors and coefficients are selected to provide to a wireless node, e.g., a base station, information regarding the channel so that the wireless node can utilize this information in precoding downlink data streams). In some embodiments, the wireless device can determine the first plurality of basis vectors (e.g., spatial basis vectors) and/or the second plurality of basis vectors (e.g., FD basis vectors) by selecting the basis vectors from a set of basis vectors provided in one or more code books. That is, the wireless can determine which basis vectors from the predefined set of basis vectors in the codebook matches closest with a basis vector required to accurately estimate the wireless channel. When the wireless device is a UE, it can generate a CSI report based on the CSI and generate a transmission waveform based on the CSI report and transmit it to a base station (e.g., in a physical uplink control channel (PUCCH) or a physical uplink shared channel (PUSCH)). Additional details are provided in section 1.0 above.

Clause 2. For each layer r in a plurality of R layers, selecting a subset with less than or equal to K0 non-zero coefficients from the plurality of coefficients and generating the CSI based, at least in part, on the first plurality of basis vectors, the second plurality of basis vectors, and the subset of non-zero coefficients for each of the layers r in the plurality of R layers. Additional details are provided in section 1.0 above.

Clause 3. Generating a first part of the CSI (or a first part of the CSI feedback report), The first part includes, for example, a channel quality indicator (CQI), a rank indicator (RI), and an indication of a number of non-zero coefficients across the R layers (R is a rank value).

Clause 4. Generating a second part of the CSI (or CSI feedback report), where the second part includes, for example, a precoding matrix indicator (PMI). Additional details are provided in section 2.0 above.

Clause 5. The PMI includes an indication of the first plurality of L basis vectors, an indication of the second plurality of M basis vectors, an indication of an amplitude and a phase of the plurality of coefficients, and an indication of locations of non-zero coefficients of the plurality of coefficients (e.g., the L*M plurality of coefficients in each layer r of R). Additional details are provided in section 2.0 above.

Clause 6. One or more CSI parameters within the first part of the CSI (or CSI feedback report) are jointly channel coded, one or more CSI parameters within the second part are also jointly channel coded, and the first part is channel coded independent of the second part (i.e., CSI parameters in each part are jointly channel coded, whereas different parts are channel-coded independently). Additional details are provided in section 2.0 above.

Clause 7. Constraining at least one of L, M, and K0 to cause, when a rank R is larger than a rank R0, the K0 value for rank R to be less than or equal to the K0 value for rank R0 (R>R0≥1). Additional details are provided in section 2.0 above.

Clause 8. Constraining at least one of L, M, and K0 to cause, when a rank R is larger than a rank R0, the K0 value for the rank R to be a predetermined fraction of the K0 value for the rank R0, wherein R0 is greater than or equal to one. Additional details are provided in section 2.0 above.

Clause 9. When R>R0≥1, the total number of coefficients in the subset of all the R layers is equal to or smaller than the total number of coefficients in the subset of all the R0 layers in the rank-R0 CSI. The bit width of the indication of number of non-zero coefficients depends on the L/M/K0 value when rank is R0 as well as the value of R0. As a result, although the indication of number of non-zero coefficients means the number of non-zero coefficients across a maximum number of layers, the bit width of this indication can depend on just a smaller number of rank value, e.g., R0. Additionally, in some embodiments, K0 depends on the value of L and M (e.g., K0=p*L*M). Hence, in some embodiments K0 can be constrained by constraining L, M, or other parameters used to determine K0 (e.g., p). K0 represents an upper bound of the number of non-zero coefficients. Additional details are provided in sections 2.0 and 3.0 above.

Clause 10. At least one of L, M, and K0 can be constrained based on a maximum allowed number of layers, where the maximum allowed number of layers is based on, for example, a network configuration parameter, a capability of the wireless device, a maximum rank that a code book used to determine the precoding vector can support, etc. Additional details are provided in section 3.0 above.

Clause 11. The wireless device can be a UE or a BS. That is, in some embodiments, a UE or a BS can generate CSI according to any of the clauses above. Additionally, or alternatively, a UE can generate the CSI report and send it to a wireless node (e.g., a BS). When the BS receives a CSI feedback report from the UE, the CSI feedback report would have been generated according to one or more of the clauses above. That is, the BS receives the first plurality of L basis vectors, the second plurality of M basis vectors, and the plurality of coefficients. Additionally, the CSI feedback report includes a first part and a second part as described above. In some embodiments, the BS can merely receive an indication of what the basis vectors and coefficients are without receiving the actual vectors (for example, the BS can receive an indication of a codebook index relating to corresponding basis vectors or look up the actual coefficients from a lookup table using the received indication of coefficients). Additionally, the BS need not always receive the second part of the CSI report (or need not receive the maximum number of bits that can be associated with the second part). Instead, the BS can allocate a variable number of resources to receive the second part based on the payload received in the first part of the CSI report further reducing the overhead of reporting CSI. The BS can use (but need not use) the received information to generate a precoding vector to precode downlink data streams and generates a downlink transmission waveform based on the precoded data.

The wireless device (e.g., UE) or wireless node (e.g., base station) can include a processor configured to implement a method recited in any one or more of clauses above. Additionally, the UE or base station can include a computer program product comprising a computer-readable program medium having processor executable instructions stored thereon, the instructions, when executed by a processor, causing the processor to implement a method recited in any one or more of the clauses above.

Figure 5:
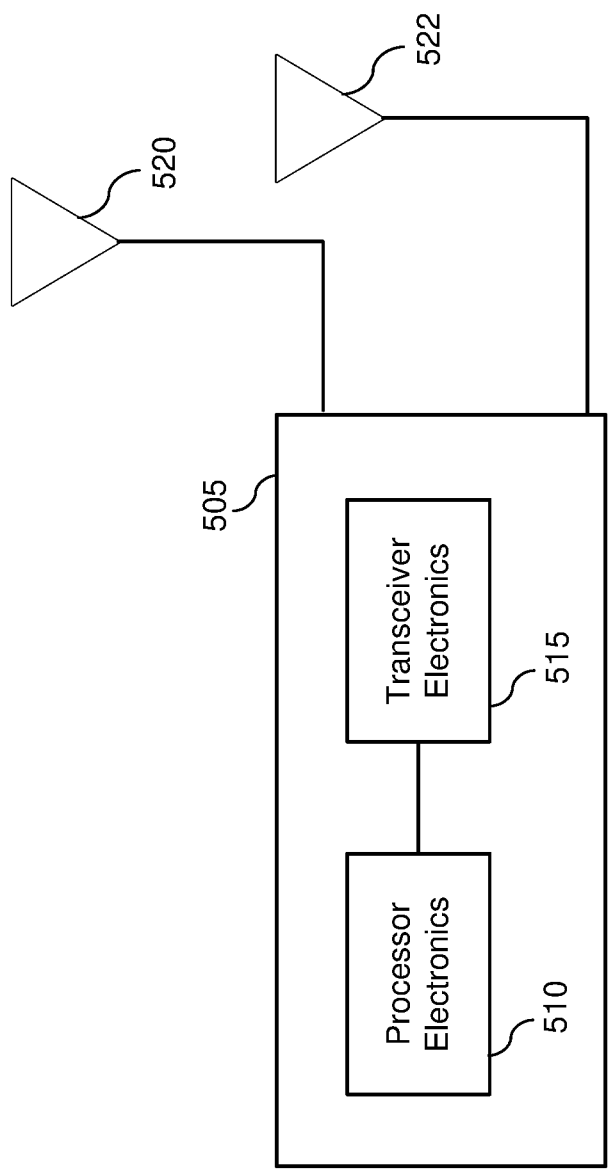
FIG. 5 is a block diagram representation of a portion of an apparatus.

FIG. 5 is a block diagram representation of a portion of an apparatus, in accordance with some embodiments of the presently disclosed technology. An apparatus 505, such as a base station or a wireless device (or UE), can include processor electronics 510 such as a microprocessor that implements one or more of the techniques presented in this document. The apparatus 505 can include transceiver electronics 515 to send and/or receive wireless signals over one or more communication interfaces such as antennas 520 and 522. The apparatus 505 can include other communication interfaces for transmitting and receiving data. Apparatus 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the apparatus 505.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   generating, by a wireless device, a channel state information (CSI) feedback report,
   wherein a first part of the CSI feedback report includes a channel quality indicator (CQI), a rank indicator (RI), and an indication of a number of non-zero coefficients across a plurality of layers,
   wherein a second part of the CSI feedback report includes a precoding matrix indicator (PMI) determined based on a first plurality of L basis vectors, a second plurality of M basis vectors, and a number of non-zero coefficients for each layer of the plurality of layers, wherein the number of non-zero coefficients for each layer is smaller than or equal to $K_0$ non-zero coefficients, wherein $K_0$ is determined based on at least one of L or M, wherein L, M, and $K_0$ are integers; and
   transmitting, by the wireless device, the CSI feedback report to a wireless node.

2. The method of claim 1, wherein a bit width of the indication of the number of non-zero coefficients across the plurality of layers is based on $K_0$.

3. The method of claim 1, wherein a bit width of the indication of the number of non-zero coefficients across the plurality of layers is based on a maximum number of layers.

4. The method of claim 3, wherein a bit width of the indication of the number of non-zero coefficients across the plurality of layers is based on $K_0$.

5. The method of claim 1, wherein a value of $K_0$ for a layer of rank R is equal to the value of $K_0$ for a layer of rank $R_0$, wherein $R>R_0$, and wherein $R_0$ is greater than or equal to 1.

6. The method of claim 1, wherein at least one of L, M, or $K_0$ is based on a network configuration parameter.

7. A method for wireless communication, comprising:
   receiving, by a wireless node, a channel state information (CSI) feedback report from a wireless device,
   wherein a first part of the CSI feedback report includes a channel quality indicator (CQI), a rank indicator (RI), and an indication of a number of non-zero coefficients across a plurality of layers,
   wherein a second part of the CSI feedback report includes a precoding matrix indicator (PMI) determined based on a first plurality of L basis vectors, a second plurality of M basis vectors, and a number of non-zero coefficients for each layer of the plurality of layers, wherein the number of non-zero coefficients for each layer is smaller than or equal to $K_0$ non-zero coefficients, wherein $K_0$ is determined based on at least one of L or M, and wherein L, M, and $K_0$ are integers.

8. The method of claim 7, wherein a bit width of the indication of the number of non-zero coefficients across the plurality of layers is based on $K_0$.

9. The method of claim 7, wherein a bit width of the indication of the number of non-zero coefficients across the plurality of layers is based on a maximum number of layers.

10. The method of claim 9, wherein a bit width of the indication of the number of non-zero coefficients across the plurality of layers is based on $K_0$.

11. The method of claim 7, wherein a value of $K_0$ for a layer of rank R is equal to the value of $K_0$ for a layer of rank $R_0$, wherein $R > R_0$, and wherein $R_0$ is greater than or equal to 1.

12. The method of claim 7, wherein at least one of L, M, or $K_0$ is based on a network configuration parameter.

13. A device for wireless communication, comprising a processor configured to:
  generate a channel state information (CSI) feedback report,
  wherein a first part of the CSI feedback report includes a channel quality indicator (CQI), a rank indicator (RI), and an indication of a number of non-zero coefficients across a plurality of layers;
  wherein a second part of the CSI feedback report includes a precoding matrix indicator (PMI) indicating a precoding matrix determined based on a first plurality of L basis vectors, a second plurality of M basis vectors, and a number of non-zero coefficients for each layer of the plurality of layers, wherein the number of non-zero coefficients for each layer is smaller than or equal to $K_0$ non-zero coefficients, wherein $K_0$ is determined based on at least one of L or M, wherein L, M, and $K_0$ are integers; and
  transmit the CSI feedback report to a wireless node.

14. The device of claim 13, wherein a bit width of the indication of the number of non-zero coefficients across the plurality of layers is based on $K_0$.

15. The device of claim 13, wherein a bit width of the indication of the number of non-zero coefficients across the plurality of layers is based on a maximum number of layers.

16. The device of claim 15, wherein a bit width of the indication of the number of non-zero coefficients across the plurality of layers is based on $K_0$.

17. The device of claim 13, wherein a value of $K_0$ for a layer of rank R is equal to the value of $K_0$ for a layer of rank $R_0$, wherein $R > R_0$, and wherein $R_0$ is greater than or equal to 1.

18. The device of claim 13, wherein at least one of L, M, or $K_0$ is based on a network configuration parameter.

19. A device for wireless communication, comprising a processor configured to:
  receive a channel state information (CSI) feedback report from a wireless device,
  wherein a first part of the CSI feedback report includes a channel quality indicator (CQI), a rank indicator (RI), and an indication of a number of non-zero coefficients across a plurality of layers, and
  wherein a second part of the CSI feedback report includes a precoding matrix indicator (PMI) indicating a precoding matrix determined based on a first plurality of L basis vectors, a second plurality of M basis vectors, and a number of non-zero coefficients for each layer of the plurality of layers, wherein the number of non-zero coefficients for each layer is smaller than or equal to $K_0$ non-zero coefficients, wherein $K_0$ is determined based on at least one of L or M, and wherein L, M, and $K_0$ are integers.

20. The device of claim 19, wherein a bit width of the indication of the number of non-zero coefficients across the plurality of layers is based on $K_0$.

21. The device of claim 19, wherein a bit width of the indication of the number of non-zero coefficients across the plurality of layers is based on a maximum number of layers.

22. The device of claim 21, wherein a bit width of the indication of the number of non-zero coefficients across the plurality of layers is based on $K_0$.

23. The device of claim 19, wherein a value of $K_0$ for a layer of rank R is equal to the value of $K_0$ for a layer of rank $R_0$, wherein $R > R_0$, and wherein $R_0$ is greater than or equal to 1.

24. The device of claim 19, wherein at least one of L, M, or $K_0$ is based on a network configuration parameter.

* * * * *